United States Patent [19]

Hoshiro et al.

[11] Patent Number: 4,468,211
[45] Date of Patent: Aug. 28, 1984

[54] TOOTHED BELT MANUFACTURE

[75] Inventors: Takeshi Hoshiro; Katsuo Kanamori, both of Kobe, Japan

[73] Assignee: Mitsuboshi Belting Ltd., Kobe, Japan

[21] Appl. No.: 320,594

[22] Filed: Nov. 12, 1981

[51] Int. Cl.³ .................... F16G 1/28; F16H 7/02
[52] U.S. Cl. ...................... 474/205; 474/153; 474/250
[58] Field of Search ............... 474/153, 154, 204, 205, 474/250, 251

[56] References Cited

U.S. PATENT DOCUMENTS

| 1,129,366 | 2/1915 | Spangler | 474/42 |
|---|---|---|---|
| 2,182,461 | 12/1939 | Yeakel | 474/205 |
| 2,397,312 | 3/1946 | Forrest | 474/153 |
| 2,554,331 | 5/1951 | Hunter | 474/205 |
| 2,727,401 | 12/1955 | Hansen | 474/122 |
| 3,002,396 | 10/1961 | Worrall, Jr. | 474/153 |
| 3,117,460 | 1/1964 | Traeger | 474/153 |
| 3,194,082 | 7/1965 | Mollenkamp | 474/205 |
| 3,313,166 | 4/1967 | Elster | 474/153 |
| 3,404,576 | 10/1968 | Cicognani et al. | 474/153 |
| 3,744,330 | 7/1973 | Sugimoto | 474/153 |
| 3,756,091 | 9/1973 | Miller | 474/153 |
| 3,835,720 | 9/1974 | Fisher et al. | 474/250 |
| 3,924,481 | 12/1975 | Gregg | 474/153 |
| 3,937,094 | 2/1976 | Cicognan | 474/205 |
| 3,968,703 | 7/1976 | Bellmann | 474/250 |
| 3,977,265 | 8/1976 | Worley et al. | 474/250 |
| 4,007,644 | 2/1977 | Weinberger | 474/153 |
| 4,037,485 | 7/1977 | Hoback | 474/153 |
| 4,041,789 | 8/1977 | Hoback | 474/153 |
| 4,108,011 | 8/1978 | Gregg et al. | 474/153 |
| 4,148,225 | 4/1979 | Redmond, Jr. et al. | 474/153 |

FOREIGN PATENT DOCUMENTS

| 1136554 | 5/1957 | France . |  |
|---|---|---|---|
| 1188754 | 9/1959 | France | 474/153 |
| 435039 | 5/1948 | Italy . |  |

Primary Examiner—John E. Murtagh
Assistant Examiner—Andrew Joseph Rudy
Attorney, Agent, or Firm—Wood, Dalton, Phillips, Mason & Rowe

[57] ABSTRACT

A power drive system including a toothed belt (10) arranged for improved engagement with a grooved pulley (15). The belt teeth (13) define, in longitudinal cross section, planar flank surfaces (22, 23) and an intermediate arcuate tip surface (25). The pulley groove (14) has corresponding planar flank surfaces (17, 18). The arcuate distal portion of the belt tooth is disposed within an arcuate segment centered on the point of intersection (19) of a flank surface (17) of the belt pitch line (20) defined by the tensile members (12) of the belt body portion. The tooth tip portion (25) defines a circular cross section centered on a point (37) disposed within a preselected range on the tooth centerline (24).

12 Claims, 8 Drawing Figures

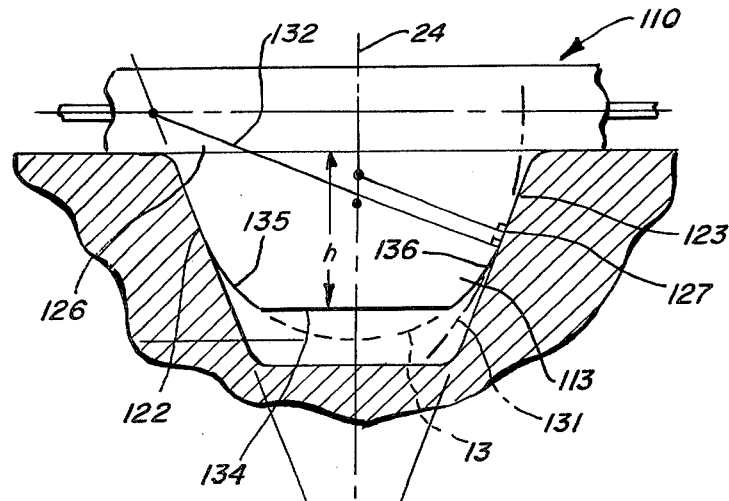
FIG. 5
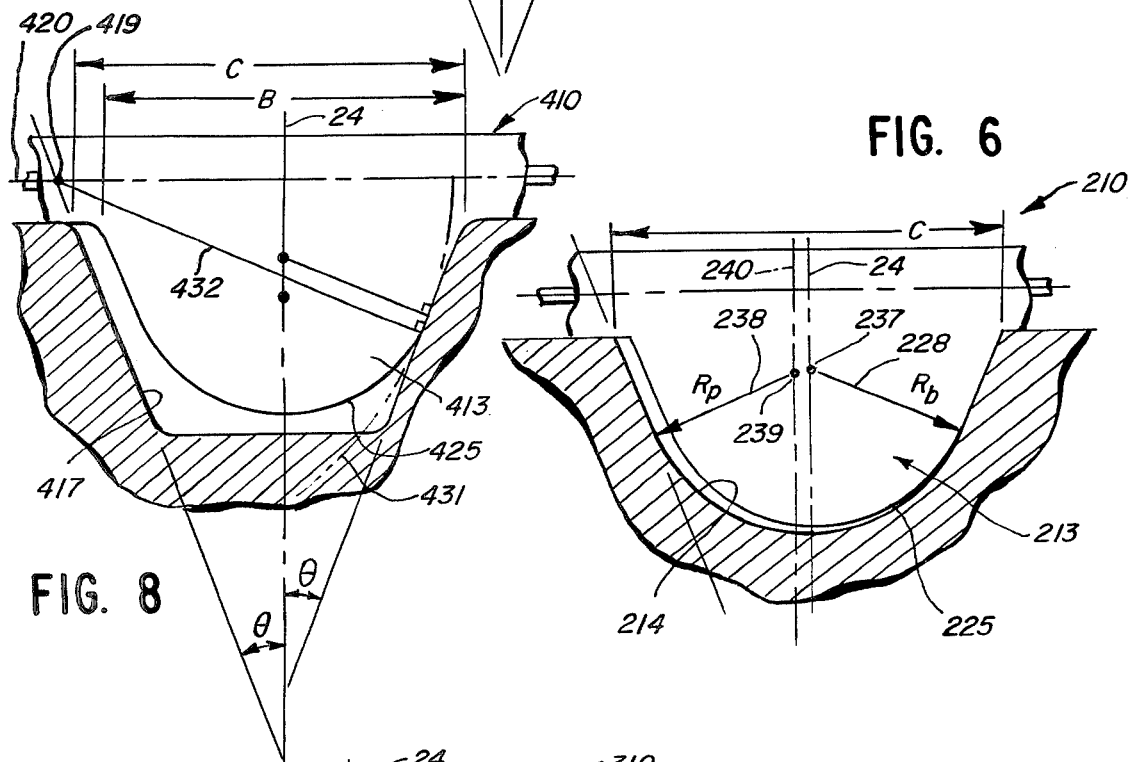
FIG. 6
FIG. 8
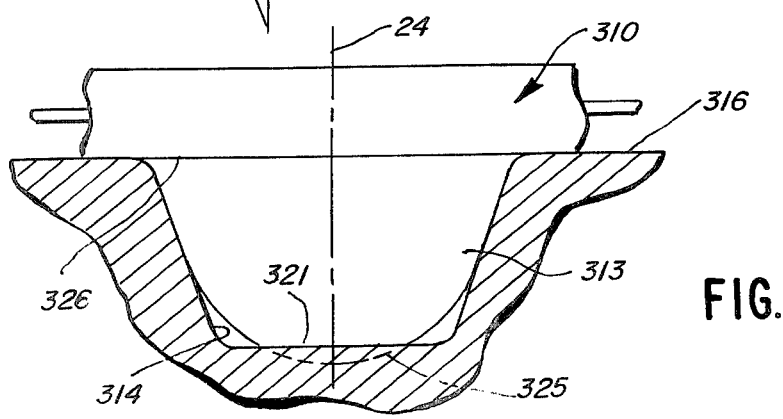
FIG. 7

TOOTHED BELT MANUFACTURE

BACKGROUND OF THE INVENTION

1. Field of the Invention

This invention relates to drive belts and in particular to toothed drive belts.

2. Description of the Prior Art

One form of conventional drive belt comprises a cog, or toothed, belt having a longitudinally extending body portion and a plurality of longitudinally spaced teeth projecting from the body portion. The teeth are adapted to be received in grooves of a toothed pulley for effecting a positive, nonslip connection therebetween. As a result, such belts may be used without lubrication as is required with conventional gear wheel drives and chain drives.

A problem, however, has arisen in the use of such toothed belts relative to interference between the belts and pulley during engagement and disengagement of the teeth so as to result in shortened useful life. More specifically, such interference may produce undesirable friction and cracking of the belt at the tooth roots.

One attempted solution to the wear problem has been to form the belt with trapezoidal teeth and to form involute pulley grooves. An example of such a belt is shown in U.S. Pat. No. 3,404,576. Such toothed belts, however, have been found to result in short life due to constant pressure exerted onto the belt tooth flanks in operation.

Another attempted solution to the problem is disclosed in U.S. Pat. No. 3,117,460. However, the belt disclosed therein does not fully satisfactorily solve the problem because of elongation of the tensile members, permitting the tooth-to-tooth pitch of the belt to increase in use. Resultingly, hard stress forces are generated on the roots of the teeth, resulting in cracks.

SUMMARY OF THE INVENTION

The present invention comprehends an improved toothed belt structure having long, troublefree life notwithstanding the transmission of high work loads therethrough. The belt structure maintains high precision in the positive drive engagement.

More specifically, the invention comprehends the provision of such an improved toothed belt for use with a toothed pulley wherein the confronting flank surfaces of successive teeth are planar defining a groove having an included angle of $2\theta$ and opening radially outwardly to a pulley circumferential surface, the groove further defining a belt pitch line, and a bottom surface at the inner end of the flank surfaces. The improved toothed belt structure includes a body portion provided with a longitudinal outer tensile member at the belt pitch line, and a plurality of longitudinally spaced teeth arranged to be successively received in the grooves of the pulley, the teeth being defined by transverse planar leading and trailing flank surfaces defining an included angle of substantially $2\theta$ and having inner ends, and a tip surface extending between the inner ends of the belt flank surfaces, the inner ends of the planar flank surfaces in cross section being located at a point of intersection of a line perpendicular to the flank surfaces and crossing the radial centerline of the groove in the portion thereof defined radially outwardly by an outer point at the tooth roots and radially inwardly by an inner point spaced inwardly from the outer point by a distance $0.5B\tan\theta$, where B is the width of the belt tooth at the tooth root.

In the illustrated embodiment, the tip surface of the teeth, in cross section, defines a circular segment centered on the intersection point and having a radius equal to the length of the line perpendicular to the flat surface.

In the illustrated embodiment, the tip surface of the teeth is disposed, when the belt is in static engagement with the pulley, within a circular arc centered on the intersection point of the plane of one of the belt flank surfaces with the belt pitch line and having a radius equal to the length of the line from the last named intersection point to a point of perpendicular intersection with the plane of the other of the belt flank surfaces.

In the illustrated embodiment, the pulley bottom surface is planar so as to define with the flank surfaces thereof a trapezoidal groove.

In one form of the invention, the tip surface of the belt teeth is cylindrical.

In another form of tooth embodying the invention, the tip surface defines concentric cylindrical portions extending from the inner end of the belt flank surfaces and a distal planar portion extending between inner ends of the cylindrical portions.

The height of the tooth may be shortened in the range of 5% to 25% by the provision of the planar distal surface.

In one form, the cross-sectional shape of the belt tooth is identical to the cross-sectional shape of the pulley groove.

In one form, the height of the tooth from the tooth root is greater than the depth of the pulley groove from the circumferential surface.

In another form, the height of the undistorted tooth is the same as the depth of the pulley groove, whereby the distal tip of the tooth is engaged with the groove bottom surface when the belt is operated with the pulley.

In another form, the tooth is smaller than the groove, whereby a gap is provided between confronting flanks of the tooth and the pulley when the belt is in static engagement with the pulley.

In the illustrated embodiment, the included angle between the flanks of the teeth is in the range of approximately 30° to 50°.

The improved belt construction provides reduced interference between the tooth tip and groove flanks of the pulley. As a result, extended useful life is provided. The belt is adapted for use where high work load power transmission is required.

BRIEF DESCRIPTION OF THE DRAWING

Other features and advantages of the invention will be apparent from the following description taken in connection with the accompanying drawing wherein:

FIG. 5 is a cross-section illustrating another form of belt tooth within the scope of the invention;

FIG. 6 is a cross-section illustrating still another form of belt tooth embodying the invention;

FIG. 7 is a cross-section showing yet another form of belt tooth embodying the invention; and FIG. 8 is a cross-section illustrating the coaction between a belt tooth such as illustrated in FIG. 4 with a pulley groove of lesser depth wherein the tooth tip engages the bottom surface of the pulley groove.

DESCRIPTION OF THE PREFERRED EMBODIMENT

Figure 1:
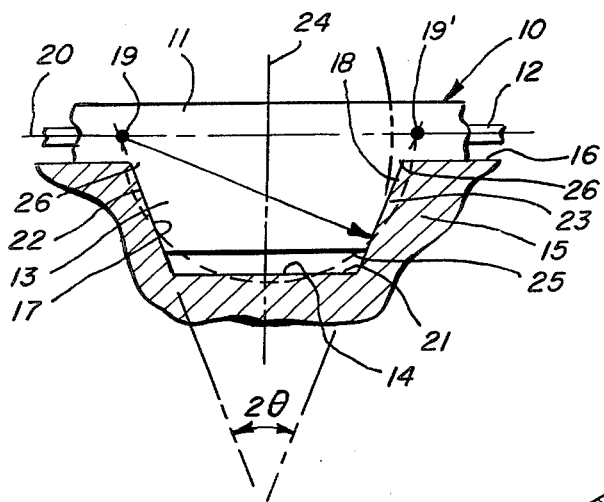
FIG. 1 is a schematic longitudinal cross-section of a belt tooth received in a pulley groove illustrating a number of parameters of the pulley construction of the invention.

As illustrated in FIG. 1, the invention is concerned with the manufacture of a drive belt generally designated 10 having a longitudinally continuous body portion 11 in which is embedded a plurality of longitudinally extending tensile cords 12 at the belt pitch line. The belt is provided with a plurality of longitudinally spaced teeth 13 adapted to be received in complementary grooves 14 of a pulley 15 defining an outer circumferential surface 16. The pitch line of the pulley coincides with the pitch line of the belt, permitting a smooth engagement and disengagement of the belt teeth relative to the pulley in the pulley grooves, as illustrated in FIG. 1.

In the illustrated embodiment, the belt is formed of a suitable material, such as rubber, synthetic resin, etc.

As further shown in FIG. 1, the pulley groove 14 defines a first flank surface 17 and an opposite flank surface 18 having an included angle of $2\theta$. The flank surfaces, in the illustrated embodiment, are planar and define, in cross section, intersection points 19 and 19', with the belt pitch line 20 defined by the tensile cords 12, as discussed above.

The pulley groove further defines a bottom surface 21.

The belt teeth 13 define flank surfaces 22 and 23, which, in the illustrated embodiment, are planar and define an included angle of approximately $2\theta$. The belt tooth defines a vertical or radial centerline 24. The belt tooth further defines a distal tip surface 25 and belt tooth root portions 26, at the juncture with the body portion 11.

Figure 2:
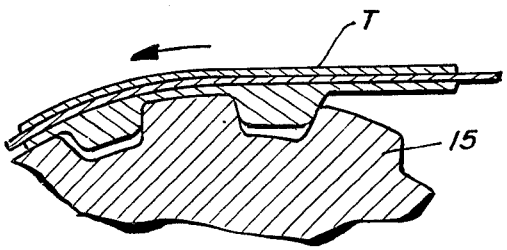
FIG. 2 is a fragmentary section illustrating the engagement of a conventional toothed belt with a conventional pulley under a high work load condition.
Figure 3:
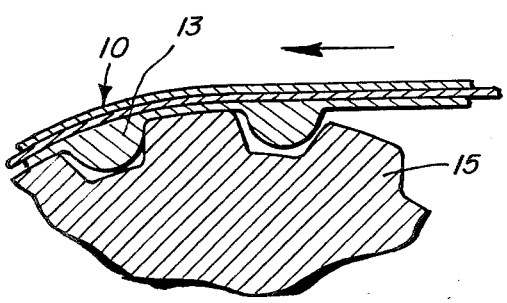
FIG. 3 is a sectional view illustrating the engagement of a toothed belt embodying the invention with a drive pulley.

The present invention is concerned with the provision of improved belt tooth configuration providing improved long troublefree life of the belt. As indicated above, the improved functioning of the belt results from an improved cross-sectional configuration thereof, as will be brought out in greater detail hereinfollowing. Thus, as seen in FIG. 2, a conventional toothed belt T has engagement with the pulley 15 which produces high stresses, causing root cracking and the like. As shown in FIG. 3, the drive belt 10 of the present invention has a modified cross-sectional configuration providing substantially improved low friction, low stress engagement and disengagement relative to the pulley 15 as the teeth 13 are brought into and from operative relationship with the pulley.

Figure 4:
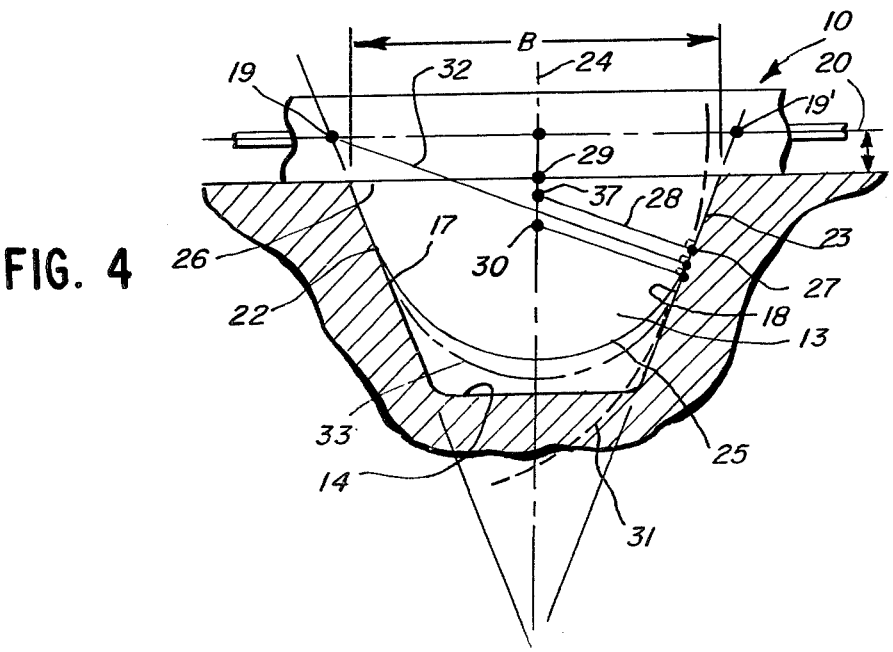
FIG. 4 is a fragmentary enlarged section illustrating in greater detail the parameters of the belt construction embodying the invention.

More specifically, the invention comprehends the provision of a drive belt 10 wherein the flank surfaces 22 and 23 thereof are planar. Each flank surface extends inwardly to a point 27 which comprises a point of intersection of a line 28 perpendicular to the flank surface and crossing the radial centerline of the groove 24 in the portion thereof defined radially outwardly by an outer point 29 on the radial centerline at the tooth root 26 and defined radially inwardly by an inner point 30 spaced inwardly from the outer point by a distance equal to $0.5B \tan \theta$ where B is the width of the belt teeth at the tooth root. As shown in FIG. 4, line 28 may be positioned with its lefthand end anywhere along the line portion between points 29 and 30 so as to extend perpendicular to the tooth flank surface 23. While the description of the configuration of the tooth flank surfaces is above described relative to tooth flank surface 23, it should be understood that a similar determination is made as to the extent of the tooth flank surface 22, whereby the tooth flank surfaces are symmetrical about the radial centerline 24.

In the embodiment of FIG. 4, the tip surface 25 is cylindrical and, thus, arcuate in cross-section. As illustrated in FIG. 4, the tip surface 25 is preferably disposed outwardly of a circular arc 31, which is drawn with intersection point 19 as its center, and having a radius 32 which perpendicularly intersects the tooth flank surface 23. The portion of the tip surface 25 on the opposite side of radial centerline 24 is caused to lie similarly within such an arc centered on the opposite intersection point 19' of flank surface 23, with the belt pitch line 20.

In the embodiment of FIG. 4, the distal surface 25 of the tooth is spaced upwardly from the groove bottom surface 14. This is true for all dispositions of the tip surface, including the lowermost position 33 generated by the line 28 extending from the lowermost point 30.

By rounding the tip surface 25, it is caused to extend away from the groove flank surfaces 17 and 18 so as to permit smooth engagement and disengagement of the belt relative to the pulley even under extremely heavy load drive conditions tending to cause an increased tooth-to-tooth pitch due to elongation of the tensile member.

The rounded distal portions 25 further assure low noise in the operation of the drive by virtue of the smooth engagement and disengagement, while yet the planar flank surfaces provide a positive drive engagement between the belt and pulley.

Referring to FIG. 5, a modified form of belt tooth generally designated 113 is shown to comprise a tooth having a cross-sectional configuration generally similar to that of tooth 13, but having a truncated distal portion defining a planar distal surface 134 extending between arcuate segments 135 and 136 extending inwardly from the inner ends 127 of the planar flank surfaces 122 and 123 thereof. Thus, the belt tooth 113 is similar to belt tooth 13, but is truncated, or shortened, by the provision of the planar surface 134 at the distal end thereof. In the illustrated embodiment, the shortening of the tooth may be in the range of approximately 75 to 95% of the height of the full arcuate tooth 13, as illustrated by the dotted line 13 in FIG. 5. More specifically, the dimension h from the root portion 126 of the distal surface 134 is preferably within the range of 75% to 95% of the height of the tooth along the centerline 24 downwardly from the root portion 126 to the imaginary surface 13.

Thus, while the tooth 113 is shortened by the truncated configuration thereof, it provides effective power transmission in the same manner as does tooth 13. Tooth 113 is adapted for use with shallow bottomed grooved pulleys, as provided in many conventional pulleys.

As further shown in FIG. 5, the distal arcuate surface portions 135 and 136 are preferably inwardly of the arcs 131 defined by the radii 132, as discussed relative to tooth 13.

Referring now to the embodiment of FIG. 6, a further modified form of tooth generally designated 213 is shown to comprise a tooth generally similar to tooth 13. However, the radius 228 of the tip surface 225 is taken from the intersection point 237 on the tooth centerline 24, whereas the complementary arcuate surface 214 defining the bottom surface of the pulley groove is defined by a radius 238 taken by a similar intersection point 239 on the centerline 240 of the pulley groove. The relationship between the length of the pulley radius 238 and the belt tooth radius 228 is mathematically expressed as $0 \leq Rp - Rb \leq 0.02C$, where Rp is the length of line 238 and Rb is the length of 228. Thus, in tooth 113, $Rp - Rb = 0$, whereas in the embodiment of FIG. 6, a positive displacement is provided between the points 237 and 239.

Tooth 213 provides an improved engagement and disengagement with the pulley while providing a controlled backlash gap therebetween.

In the embodiment of FIG. 7, a further modified form of toothed belt generally designated 310 is shown to be provided with teeth 313 which, while having a configuration similar to the configuration of teeth 13, have a height measured inwardly from the belt tooth root 326 along the tooth centerline 24 which is greater than the depth of the pulley groove 314 inwardly from the pulley circumferential surface 316. Thus, in the embodiment of FIG. 7, the arcuate tip surface 325 engages the pulley bottom surface 321 prior to the engagement of the flank surfaces of the tooth with the flank surfaces of the pulley groove. Thus, the belt 310 is adapted for use with pulleys having shallow grooves. The improved tooth configuration 313 permits the tip surface 325 to absorb the impact energy resulting from the engagement of the belt teeth with the pulley during use, thus eliminating noise. As the other parameters of the configuration of teeth 313 are similar to those of teeth 13, similar improved long life and troublefree operation are also provided in belt 310.

Still another form of belt generally designated 410 embodying the invention is illustrated in FIG. 8. In this embodiment, the belt configuration is similar to that of belt 10 except that the width B of the tooth is less than the width C of the pulley groove. As shown, however, the arcuate distal portion 425 of the tooth 413 is similarly disposed within the arc 431 generated from the point 419 of intersection of the pulley groove flank surface 417 with the belt pitch line 420. Thus, in belt 410, interference between the tooth 413 and the pulley during engagement and disengagement is effectively prevented in the same manner as relative to the engagement and disengagement of the pulley tooth 13 with the pulley groove flank surface 18, in the embodiment of FIG. 4.

Each of the belt tooth configurations of the modified forms of belt 110, 210, 310 and 410, as illustrated in FIGS. 5, 6, 7 and 8, respectively, is similar to that of tooth 13 of the embodiment of FIG. 4 except as otherwise described. In each of the embodiments of FIGS. 5, 6, 7 and 8, structural elements of the belt thereof which are similar to the elements of belt 10 are described with similar reference numerals but 100 different respectively. Except as discussed specifically with reference to the different embodiments, each functions in a similar manner.

More specifically, in each of the different embodiments comprehended by the invention, the belt tooth tip surfaces are disposed within a preselected arc centered on a point defined by the intersection of a pulley flank surface and the belt pitch line. The tip section of the tooth is arcuate in extension from the inner end of the planar flank surfaces of the belt tooth so as to permit the distal portion of the tooth to extend away from the pulley groove flank surfaces for improved engagement and disengagement in the operation of the drive. As a result, increase in the tooth pitch of the belt such as due to elongation of the tensile member during high load drive conditions is prevented from causing interference between the tooth tip section and the pulley groove flanks. Resultingly, cracking of the belt tooth root portion is effectively avoided and force is transmitted between the belt and pulley in a uniform low noise manner. The belts of the present invention provide high accuracy in use in addition to a long troublefree life.

The foregoing disclosure of specific embodiments is illustrative of the broad inventive concepts comprehended by the invention.

We claim:

1. For use with a toothed pulley wherein the confronting flank surfaces of successive teeth are planar defining a groove having an included angle of $2\theta$ and opening radially outwardly to a pulley circumferential surface, said groove further defining a flat bottom surface at the inner end of said flank surfaces, an improved toothed belt comprising a body portion provided with a longitudinal outer tensile member at the belt pitch line, and a plurality of longitudinally spaced teeth arranged to be successively received in the grooves of the pulley, each of said teeth being defined by transverse planar leading and trailing flank surfaces defining an included angle of substantially $2\theta$ and having an inner end, and a tip surface extending between said inner ends of said belt flank surfaces of the tooth, said inner end of each of the planar flank surfaces in cross section being located at a point of intersection of a line perpendicular to the flank surfaces and crossing the radial centerline of the groove in the portion thereof defined radially outwardly by an outer point at the tooth root and radially inwardly by an inner point spaced inwardly from said outer point by a distance $0.5B\tan\theta$, where B is the width of the belt tooth at the tooth root, each of the leading and trailing portions of said tip surface in cross section defining a circular segment centered on said intersection point and having a radius equal to the length of said line perpendicular to said flank surface whereby said teeth have improved engagement and disengagement relative to the pulley groove surfaces in drive operation thereof.

2. The belt structure of claim 1 wherein said tip surface is disposed, when said belt is in static engagement with the pulley, within a circular arc centered on the intersection point of the plane of one of said belt flank surfaces with said belt pitch line and having a radius equal to the length of the line from said last named intersection point to a point of perpendicular intersection with the plane of the other of said belt flank surfaces.

3. The belt structure of claim 1 wherein said pulley bottom surface is planar defining with said pulley flank surfaces a trapezoidal groove.

4. The belt structure of claim 1 wherein said tip surface is cylindrical.

5. The belt structure of claim 1 wherein said tip surface defines concentric cylindrical portions extending from said inner end of the belt flank surfaces and a distal planar portion extending between inner ends of said cylindrical portions.

6. The belt structure of claim 1 wherein said tip surface defines cylindrical portions concentrically centered on said radial centerline and extending from said inner end of the belt flank surfaces and defining inner ends, and a distal planar portion extending between said inner ends of said cylindrical portions, the height of the tooth from the tooth root to said planar portion along said centerline being in the range of 75% to 95% of the distance from said tooth root to the center of said cylindrical portions plus the radius of said cylindrical portions.

7. The belt structure of claim 1 wherein the cross-sectional shape of the belt tooth is identical to the cross-sectional shape of the pulley groove.

8. The belt structure of claim 1 wherein said tip surface in cross-section defines a circular segment centered on said intersection point and having a radius equal to the length of said line perpendicular to the flat surface and the cross-sectional shape of the belt tooth is identical to the cross-sectional shape of the pulley groove.

9. The belt structure of claim 1 wherein the height of the tooth from the tooth root is substantially less than the depth of the pulley groove from said circumferential surface.

10. The belt structure of claim 1 wherein the height of the undistorted tooth from the tooth root is the same as the depth of the pulley groove from the circumferential surface and the distal tip of the tooth is engaged with said groove bottom surface when the belt is operated with the pulley.

11. The belt structure of claim 1 wherein the tooth is smaller than the groove whereby a gap is provided between confronting flanks of the tooth and the pulley when said belt is in static engagement with the pulley.

12. The belt structure of claim 1 wherein $2\theta$ is in the range of approximately 30° to 50°.

* * * * *